(12) United States Patent
Yie (10) Patent No.: US 12,516,745 B2
(45) Date of Patent: Jan. 6, 2026

(54) INSTANT ON-OFF VALVES FOR HIGH PRESSURE FLUIDS

(71) Applicant: Gene G. Yie, Grants Pass, OR (US)

(72) Inventor: Gene G. Yie, Grants Pass, OR (US)

( * ) Notice: Subject to any disclaimer, the term of this patent is extended or adjusted under 35 U.S.C. 154(b) by 0 days.

(21) Appl. No.: 18/226,966

(22) Filed: Jul. 27, 2023

(65) Prior Publication Data

US 2025/0035233 A1    Jan. 30, 2025

(51) Int. Cl.
*F16K 31/122* (2006.01)
*F16K 1/36* (2006.01)
(Continued)

(52) U.S. Cl.
CPC .............. *F16K 31/383* (2013.01); *F16K 1/36* (2013.01); *F16K 1/46* (2013.01); *F16K 31/122* (2013.01);
(Continued)

(58) Field of Classification Search
CPC .... F16K 31/122; F16K 31/124; F16K 31/363; F16K 31/383; F16K 31/423; F16K 31/42; F16K 31/426; Y10T 137/87193
See application file for complete search history.

(56) References Cited

U.S. PATENT DOCUMENTS

| | | | | |
|---|---|---|---|---|
| 2,821,355 A | * | 1/1958 | Hicks, Jr. .............. | F16K 31/423 251/129.02 |
| 3,052,444 A | * | 9/1962 | Kintner .................. | F16K 31/122 92/108 |

(Continued)

*Primary Examiner* — Kevin F Murphy
(74) *Attorney, Agent, or Firm* — Pauley Erickson & Swanson (57) ABSTRACT

An on-off valve that operates between an open position and a closed position, particularly with high-pressure working fluids, has a valve body that defines a valve cavity having a first chamber and a second chamber. A valve poppet is slidably mounted within the valve cavity. The valve poppet has a larger first end positioned within the first chamber and a smaller second end positioned within the second chamber. The valve poppet has a fluid seal around the first end and a second fluid seal around the second end. Each fluid seal is isolated in the space between the seals and the space is connected to the atmosphere. A pilot control valve is fluidly connected to the first chamber of the valve body and sends a control fluid or working fluid in and out of the first chamber and moves the valve poppet between the open position and the closed position. The pilot valve has a control tube or control rod having fluid passages made on or inside the control rod. The control rod is positioned inside a cylindrical cavity and the cavity has rod seals and bushings that define 3 separate fluid chambers, including an inlet chamber, an exit chamber and a cocking chamber. The inlet chamber is fluidly connected to the source of the control fluid. The exit chamber is fluidly connected to the exterior of the pilot valve. The cocking chamber of the control rod cavity is fluidly connected to the first chamber of the main valve. The control rod can be moved with an outside force to a first position and to a second position such that the main valve will be open when the control rod is at its first position and the main valve will be closed when the control rod is at its second position. The pilot valve can be mounted inside or outside of the main valve. The pilot valve can also be integrated into the valve poppet to form a valve cartridge for a simplified valve construction.

8 Claims, 12 Drawing Sheets

(51) Int. Cl.
*F16K 1/46* (2006.01)
*F16K 31/363* (2006.01)
*F16K 31/383* (2006.01)

(52) U.S. Cl.
CPC ...... *F16K 31/363* (2013.01); *F16K 2200/202* (2021.08)

(56) References Cited

U.S. PATENT DOCUMENTS

| | | | | |
|---|---|---|---|---|
| 3,194,266 | A * | 7/1965 | Abbott | F16K 31/423 |
| | | | | 137/625.27 |
| 3,273,579 | A * | 9/1966 | Koculyn | A01G 25/16 |
| | | | | 74/2 |
| 3,884,251 | A * | 5/1975 | Knight | F16K 17/30 |
| | | | | 251/63.4 |
| 4,566,273 | A * | 1/1986 | Baumeler | F01D 17/145 |
| | | | | 60/407 |
| 5,092,362 | A | 3/1992 | Yie | |
| 5,117,872 | A | 6/1992 | Yie | |
| 5,186,393 | A | 2/1993 | Yie | |
| 5,241,986 | A | 9/1993 | Yie | |
| 5,297,777 | A | 3/1994 | Yie | |
| 5,524,821 | A | 6/1996 | Yie et al. | |
| 5,799,688 | A | 9/1998 | Yie | |
| 6,588,724 | B2 | 7/2003 | Yie | |
| 9,228,673 | B2 * | 1/2016 | Hirai | F16K 31/122 |
| 10,267,318 | B2 * | 4/2019 | Hunt | F04D 17/10 |

\* cited by examiner

INSTANT ON-OFF VALVES FOR HIGH PRESSURE FLUIDS

BACKGROUND OF THE INVENTION

Field of the Invention

This invention relates to an on-off valve which is an essential element in many high-pressure fluid systems.

Discussion of Related Art

At relatively low fluid pressures, there are many conventional on-off valves for both liquid and gas operations. These valves are commonly identified by its mode of operation or by the shape of the key valve element involved, such as cock valves, ball valves, butterfly valves, poppet valves, needle valves and stem valves. The required force to operate these known valves is usually not relatively high and can normally be supplied using a human hand.

However, as the fluid pressure is increased, the selection of suitable known on-off valves is reduced. At common water jetting pressures, such as about 10,000 psi, the selection is reduced to needle valves and stem valves. Because high-pressure water is highly corrosive to metal valve parts, the on-off operation must be rapid. Thus, the valve operation must be by a foot and instant on-off valves can be easily used.

Now, in common water jetting operations involving pressures up to about 60,000 psi for cutting engineered materials, such as carbon fiber laminates, on-off valves are essential system components. In some field operations, many water jetting tasks require the use of hand-operated tools at pressures up to about 40,000 psi. The availability of known suitable tools is one problem to solve.

Figure 1:
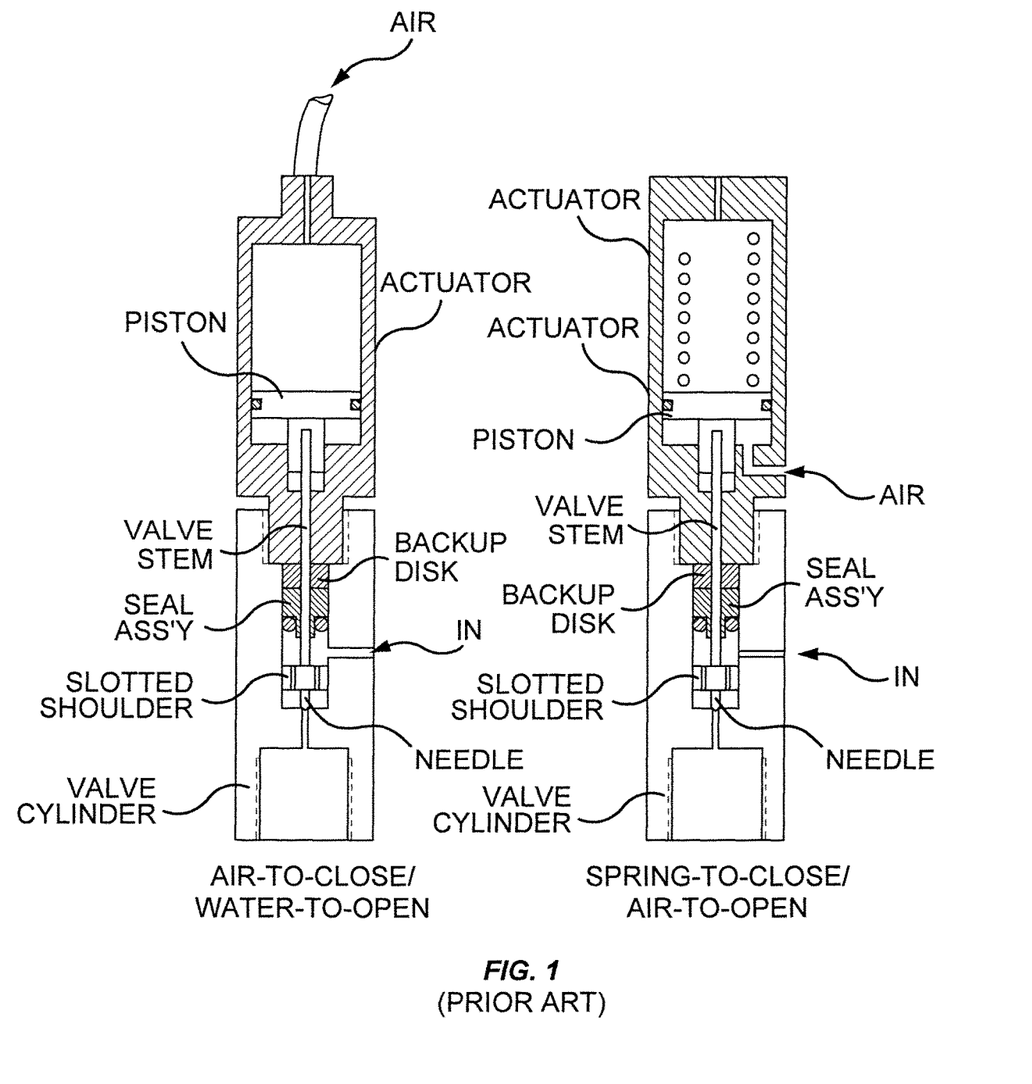
FIG. 1 shows a cross-sectional view of conventional valves, including an air-to-close/water-to-open valves and also spring-to-close/air-to-open valves.

Now, for example, 0.078 inch diameter steel needles are used to open and close a 0.045 inch diameter valve port in abrasive waterjet material cutting processes at water pressures of about 45,000 psi, such as shown in FIG. 1.

Figure 2:
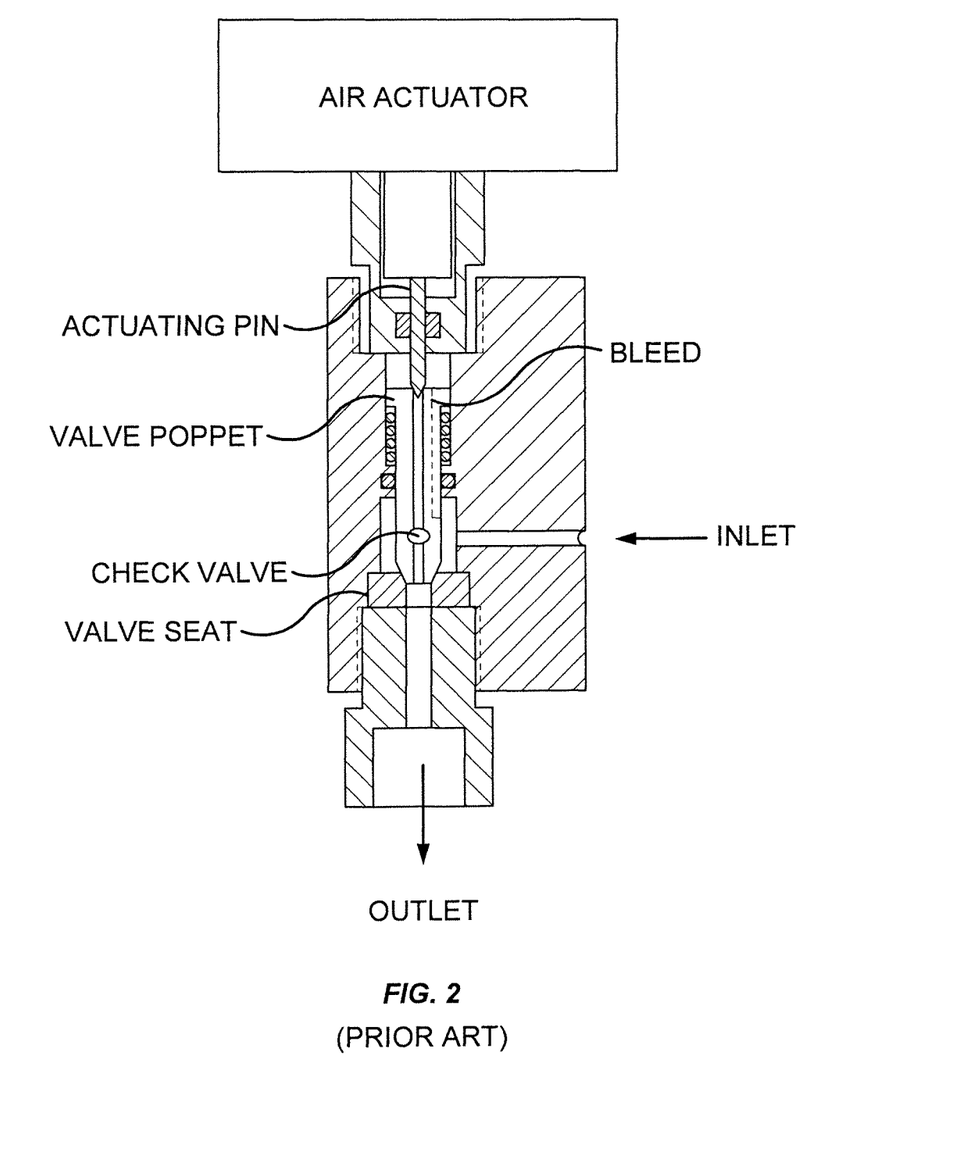
FIG. 2 shows a cross-sectional view of a conventional valve having a valve poppet and an air actuator.

The availability of these known valve actuating pins and valve ports is a common problem. As shown in FIG. 2, U.S. Pat. No. 6,588,724 teaches a poppet valve that eliminates the valve port problem because the valve poppet is relatively large but does not solve the valve actuating problem, mainly because the valve pin is relatively small and thus reduces water forces acting on the valve pin and reduces the needed external force to operate the actuating pin.

Figure 3:
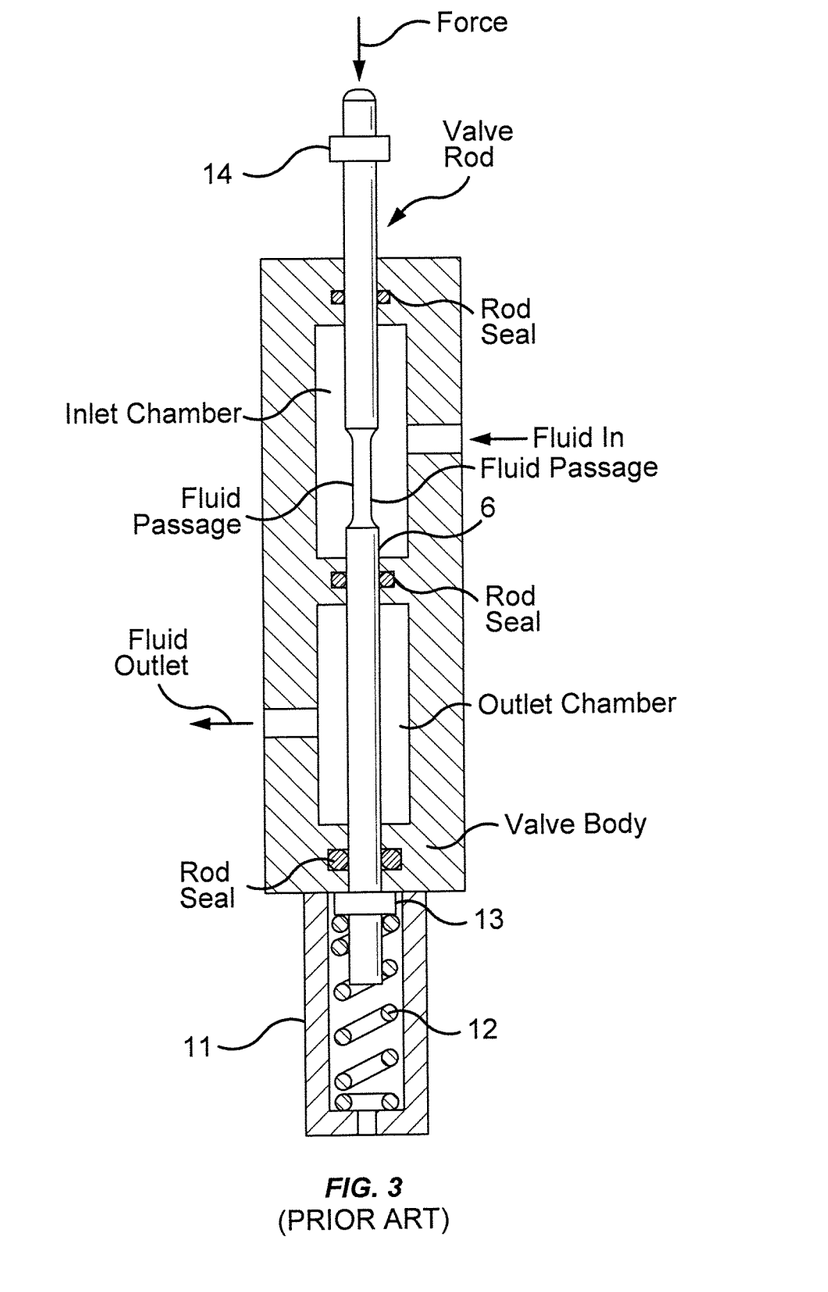
FIG. 3 shows a cross-sectional view of a conventional valve having a valve rod with a fluid passage.

As shown in FIG. 3, U.S. Pat. No. 5,799,688 teaches a rod valve that utilizes a cut-off part of a sliding valve rod to provide a passage to relatively high-pressure fluids. This known technology provides a relatively limited flow passage for the fluid and the relatively large rod seals cause relatively high friction at relatively high fluid pressures, and thus operating such known valves is relatively difficult when using the human hand.

SUMMARY OF THE INVENTION

For at least these reasons, as the water jetting processes become more in demand and the pressures and flow rates are continuously increasing, there is an apparent increased need for improved on-off valves that can handle such relatively high pressures and flow rates. One object of this invention is to provide on-off valves that can successfully operate at the increased pressures and flow rates.

According to some embodiments of this invention, an on-off valve has a relatively large valve port and a durable valve seat that can operate at relatively high pressures. In some embodiments of this invention, the on-off valve eliminates a need for actuating pins that require a strong or increased external force for operation, for example, so that a human hand can safely operate the on-off valve at relatively high pressures. Many conventional on-off valves cannot be easily operated at relatively high pressures. The on-off valve according to this invention provides some solutions to the problems associated with the conventional on-off valves.

BRIEF DESCRIPTION OF THE DRAWINGS

Different objects of this invention can be accomplished with certain features, according to different embodiments of this invention, wherein.

DESCRIPTION OF THE INVENTION

Some conventional valves are taught by U.S. Pat. Nos. 5,799,688 and 6,588,724, the entire disclosures of which are incorporated into this specification by reference to U.S. Pat. Nos. 5,799,688 and 6,588,724.

Figure 4:
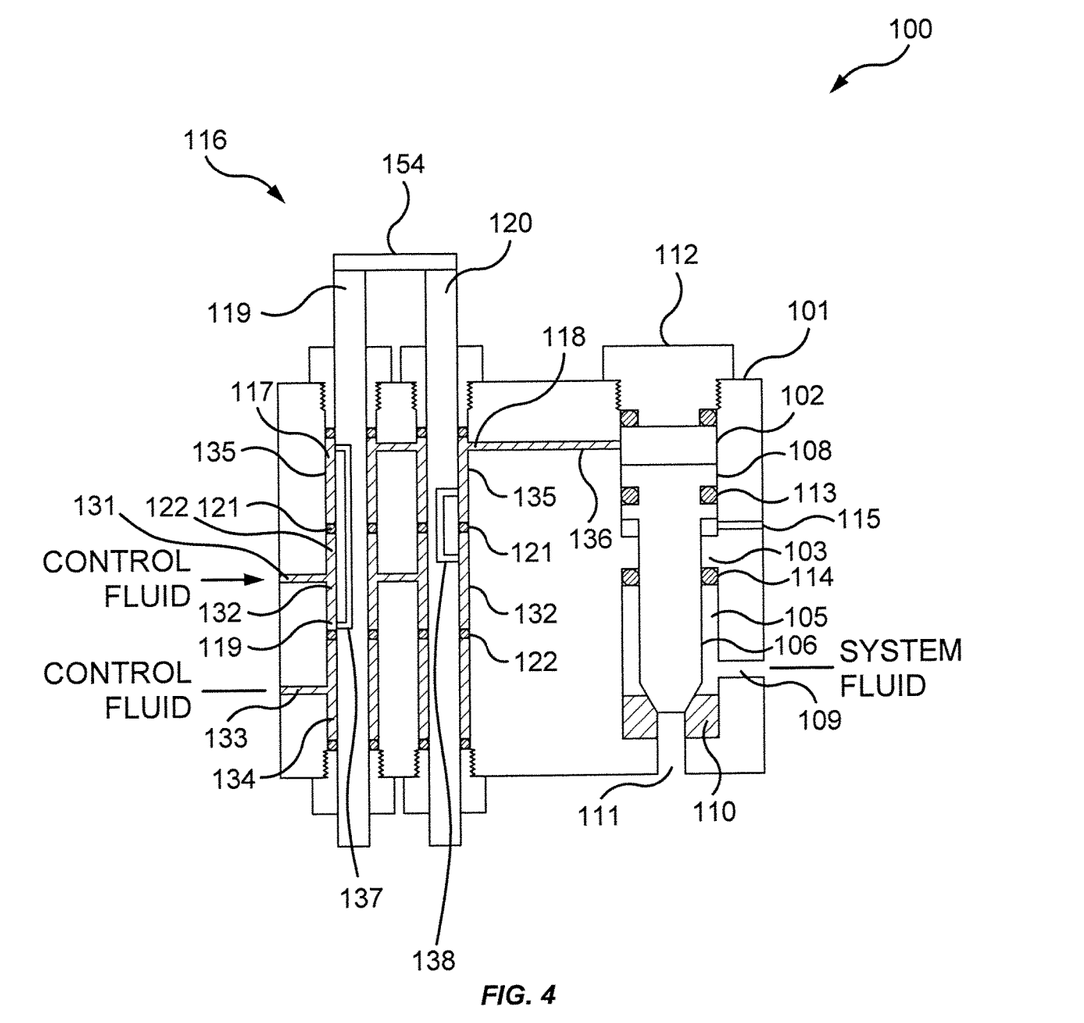
FIG. 4 shows a cross-sectional view of a basic valve having a main valve and a separate pilot valve, with a twin control rod set up in a down position, according to one embodiment of this invention.

According to some embodiments of this invention, FIG. 4 shows a basic valve having or comprising a separate main valve 100 and a separate pilot valve 116. In some embodiments of this invention, main valve 100 has valve body 101, cylindrical valve cavity 102 divided by partition 103 into upper chamber 104 and lower chamber 105. In some embodiments of this invention, cylindrical valve poppet 106 straddles partition 103 and has end portion 107 positioned in chamber 105 and opposite end portion 108 positioned in or within chamber 102.

In some embodiments of this invention, the cross-sectional area of valve poppet end 108 is longer or more than the cross-sectional area of valve poppet end 107. According to some embodiments of this invention, valve inlet 109 is in communication with chamber 105. Valve seat 110 is inside or within chamber 105 and has a bore in communication with valve outlet 111. Valve chamber 104 has plug 112 that seals and keeps valve chamber 102 in a fluid tight condition.

In some embodiments of this invention, valve poppet end 108 has circumferential seal 113 and valve poppet end 107 also has circumferential seal 114 so that there are 2 seals that isolate the circumferential space 104 across valve chamber partition 103 and is in communication with the atmosphere through bleed 115. Valve 100 has or comprises attached pilot valve 116 parallel to main valve 100 and sharing valve body 101. It is apparent that pilot valve 116 can be completely separate from main valve 100 and involve or include two separate fluid systems, a system fluid in main valve 100 and a control fluid in pilot valve 116.

According to some embodiment of this invention, FIG. 4 shows a basic valve having or comprising separate main valve 100 and separate pilot valve 116.

In some embodiments of this invention, pilot valve 116 has or comprises two parallel cylindrical cavities 117 and 118 housing control rods 119 and 120. Control rod 119 has rod seals 121 and bushings 122 that define or form rod cavity 117 into 3 separate zones or chambers. Control rod 120 also has rod seals 121 and bushings 122 that define or form rod cavity 118 into 3 separate zones or chambers. In some embodiments of this invention, control fluid of pilot valve 116 enters into fluid inlet 131 and communicates with inlet chamber 132, and control fluid outlet 133 communicates with outlet chamber 134.

Figure 5:
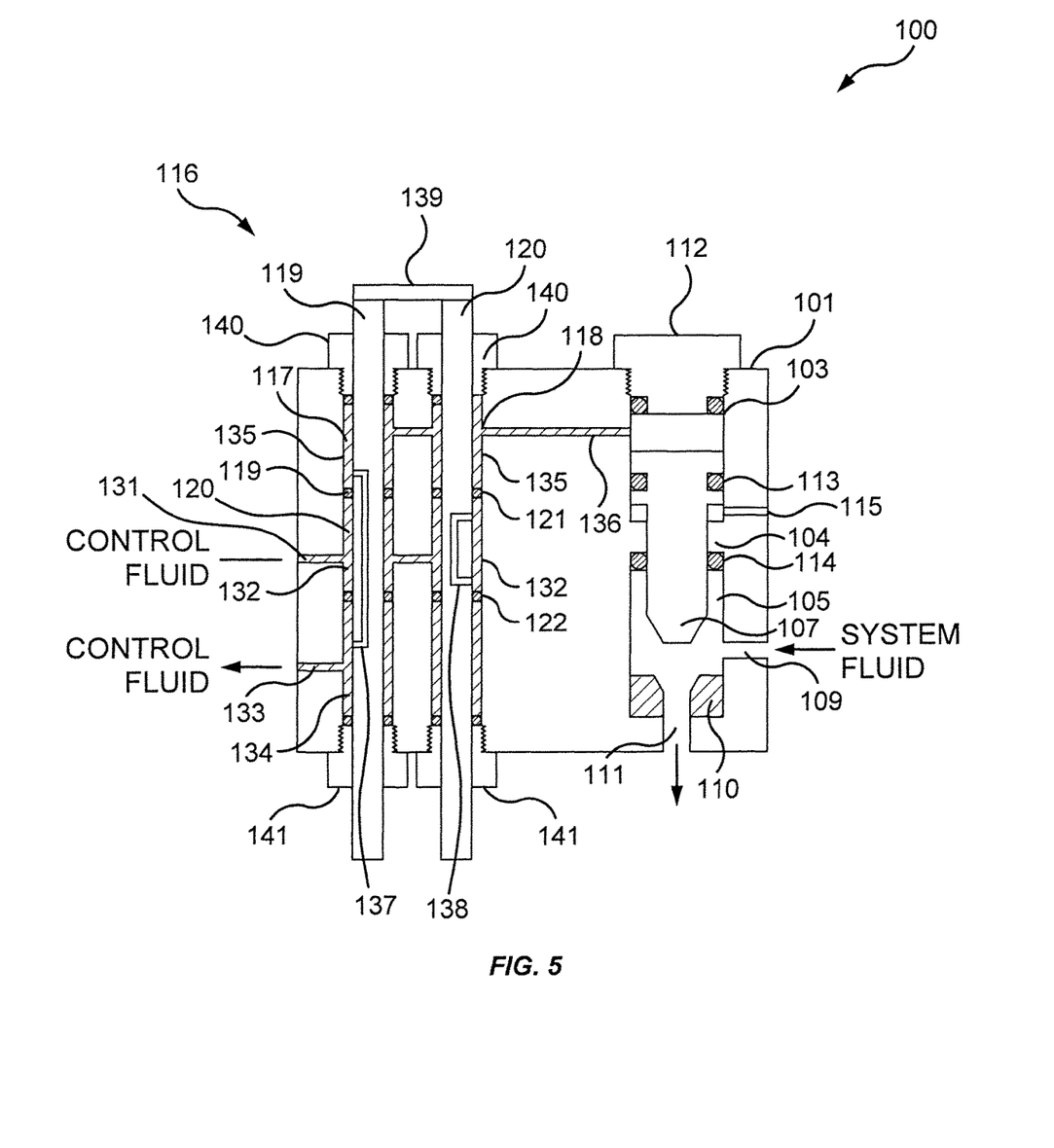
FIG. 5 shows a cross-sectional view of a basic valve as shown in FIG. 4, but with the twin control rods in an up position.

Still referring to FIGS. 4 and 5, control rods 119 and 120 have rod seals 119 and bushings 120 dividing rod cavities 117 and 118 into 3 separate zones of upper cocking zone 135, middle inlet zone or chamber 132 and lower outlet zone or chamber 134. Cocking zone 135 communicates with cocking chamber or valve cavity 102 of main valve 100 through fluid passage 136. Control rod 119 has or comprises fluid passage 137 and control rod 120 has or comprises fluid passage 138. Both fluid passages 137 and 138 are of designated length and side ports at designated locations to connect various chambers when control rods 119 and 120 are moved either individually or ganged together by a connecting bar 139. When control rods 119 and 120 are moved to their high position or first position as shown in FIG. 4 as control fluid enters into passage 131, chamber 132, through fluid passage 138, chamber 135, fluid passage 136, into valve cavity 102, and thus pushing valve poppet 108 down to close valve exit port 111. In this process, fluid passage 137 in control rod 119 is blocked in rod cavity 134 by seal 119. When control rods 119 and 120 are moved to their low position or second position as shown in FIG. 5, control fluid inside valve cavity 103 is drained through passage 136, cocking chamber 118, cocking chamber 135, fluid passage 137, outlet chamber 134, and fluid outlet 133, thus opens valve outlet port 111 due to the pressure of system fluid inside valve chamber 105.

According to some embodiments of this invention, such as shown in FIGS. 4 and 5, main valve 100 has or comprises valve poppet 106 that can be relatively large to handle relatively high flow rates of a system fluid. As shown, pilot valve 116 is for operating a control fluid in and out of a relatively small valve cavity 102. Thus, pilot valve 116 can be quite small and can easily be integrated with main valve 100. In some embodiments of this invention, to operate pilot valve 116 requires a relatively small power or force, particularly when the ends of the control rod is not exposed to system fluid or the control fluid. Thus, a relatively small external force working at the end of the control rod will be sufficient to move the control rod. In some embodiments of this invention, the control rod is robust or strong enough to handle relatively high fluid pressures and the corresponding external forces involved. Plugs 140 and 141 can keep or maintain the control rod in a secured position within or inside rod cavity 117.

Figure 6:
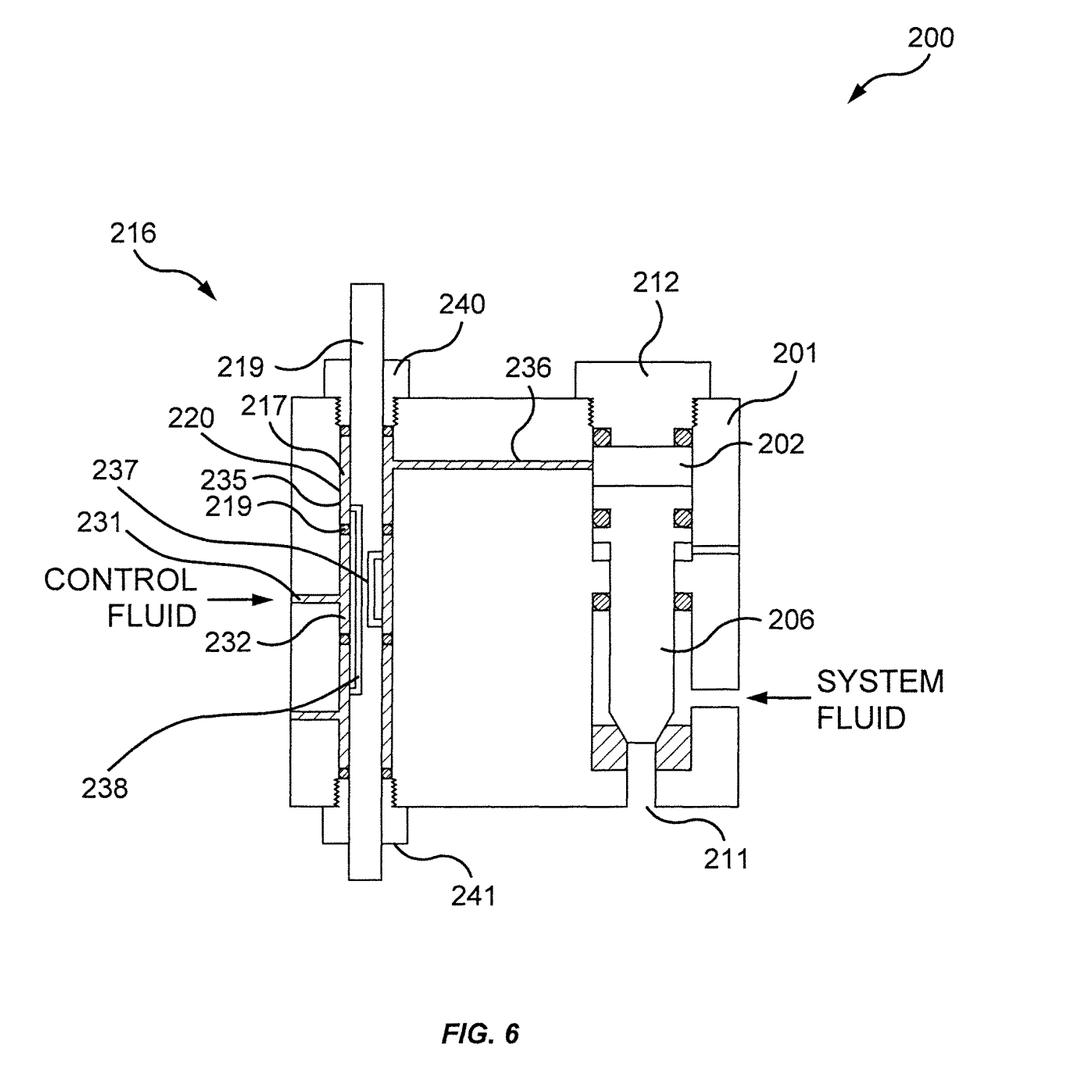
FIG. 6 shows a cross-sectional view of a basic valve with the twin control rods of the pilot valve integrated into a single rod, and with the rod in a down position, according to one embodiment of this invention.

FIG. 6 shows another embodiment of this invention, valve 200 has a pilot valve 216 having only one control rod 219 situated or positioned inside cylinder 217 surrounded by rod seals 219 and rod bushings 220 and control rod 219 has both fluid passages 237 and 238 built on the surface or inside control rod 219 positioned with a designated length and side port position for connecting predetermined chambers as in valve 100. As shown in FIG. 6, control rod 219 is at its high position or first position, control fluid enters fluid inlet 231, inlet chamber 232, fluid passage 237, fluid chamber 235, fluid passage 236, cocking chamber 202 of main valve 200 and thus pushes valve poppet 206 down to close valve port 211.

Figure 7:
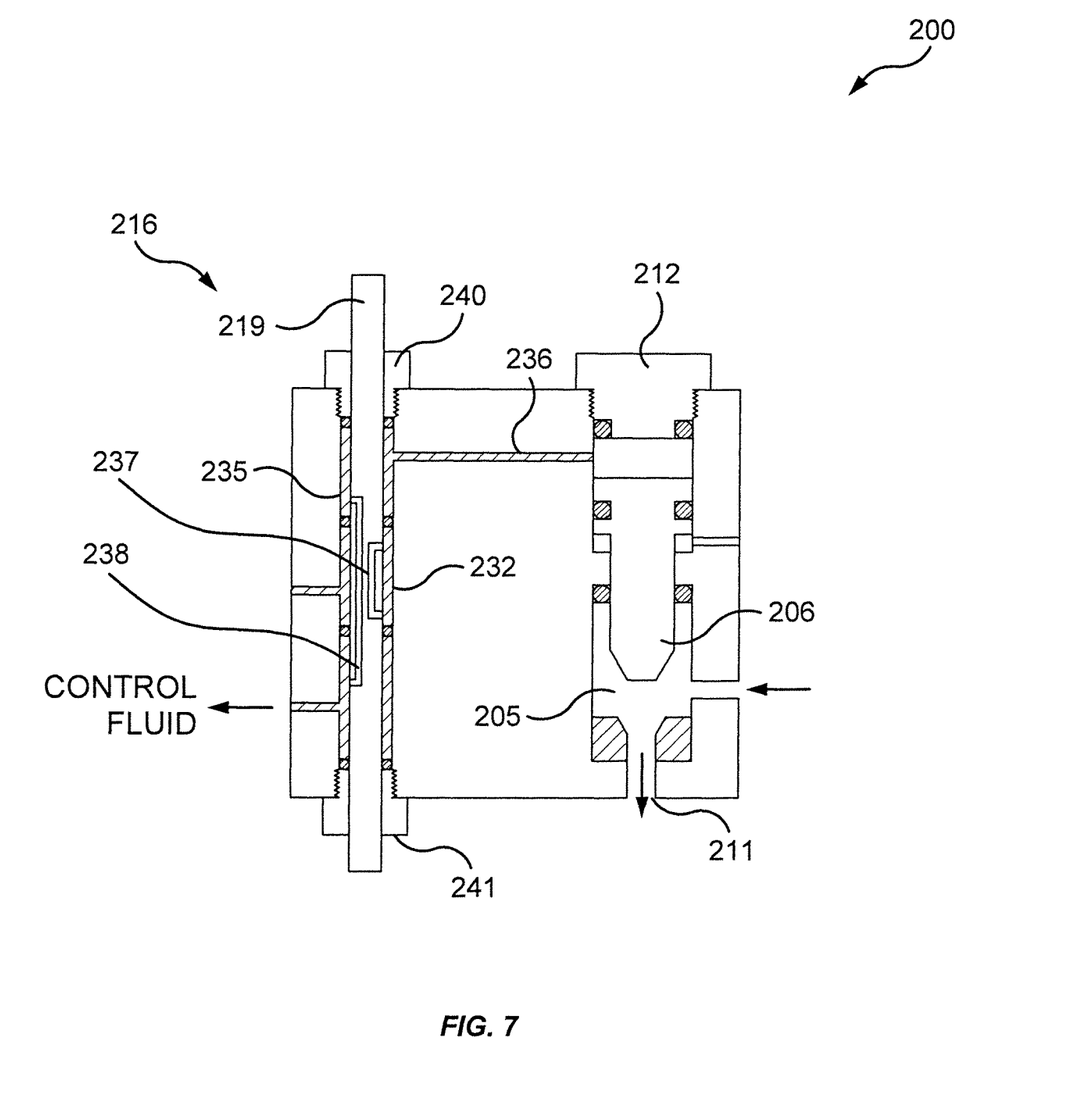
FIG. 7 shows a cross-sectional view of a basic valve as shown in FIG. 6 but with the control rod in an up position.

As shown in FIG. 7, control rod 219 is at its low position or second position, control fluid inside cocking chamber 202 of main valve flows through fluid passage 236 into cocking chamber 235, through fluid passage 238 into outlet chamber 234 and exits through fluid passage 233. Simultaneously, system fluid inside valve chamber 205 pushes valve poppet 206 upward thus opening valve port 211. In the process, fluid passage 237 is positioned inside inlet chamber 232 and is not functioning.

FIGS. 6 and 7 show that having one control rod simplifies the construction of valve 200 and facilitates the integration of the pilot valve with the main valve of this invention despite the complication of providing fluid passages in a single control rod.

Figure 8:
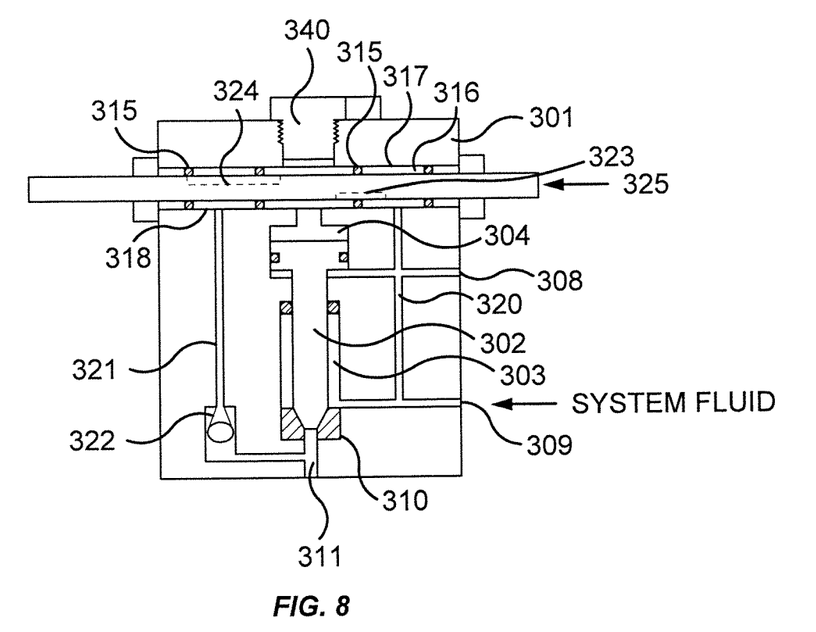
FIG. 8 shows a cross-sectional view of a pilot valve partially integrated with a main valve, with the control rod in a valve-closed position, according to one embodiment of this invention.

FIG. 8 shows another embodiment of this invention. Valve 300 has a pilot valve partially integrated with main valve 100. Valve 300 has or comprises valve body 301, valve poppet 302 situated or positioned across valve inlet chamber 303, and cocking chamber 304. Poppet seals 305 and 306 isolate or separate chamber space 307 that has or comprises or comprises air bleed 308. Thus, fluid forces in valve chambers 303 and 304 can cause valve poppet 302 to move up and down. Valve 300 has or comprises valve inlet 309, valve seat 310 and valve outlet 311. Valve 300 has or comprises pilot valve 312 mounted on top of or above valve cavity 304. Pilot valve 313 has or comprises control valve cavity 313 accommodating control rod 314 and its rod seals 315 and rod bushings 316. Rod seals 315 and rod bushing 316 divide rod cavity 313 into 3 zones or chambers, inlet chamber 317, outlet chamber 318, and cocking chamber 319.

Figure 9:
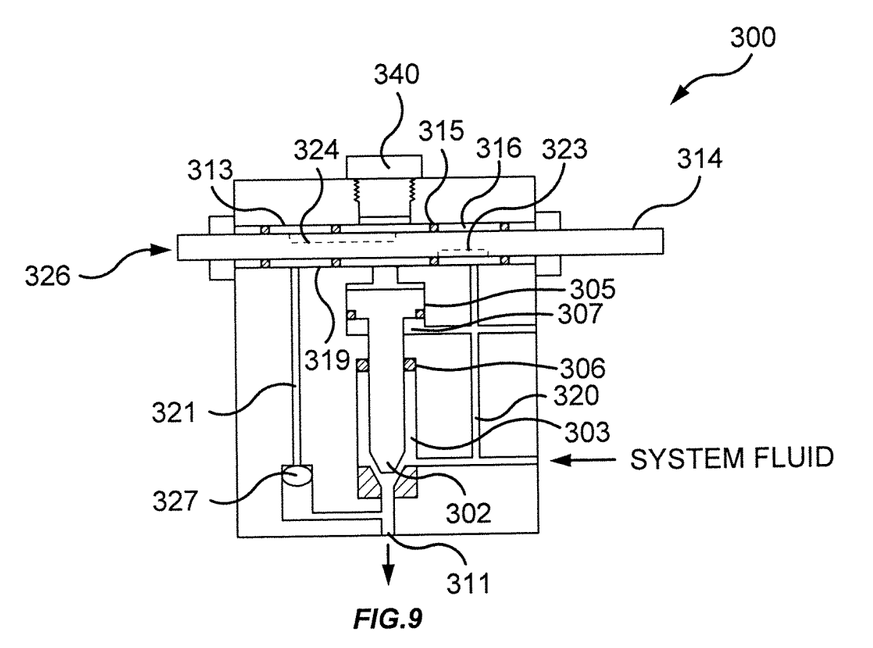
FIG. 9 shows a cross-sectional view of the pilot valve as shown in FIG. 8, but with control rod in a valve-open position.

Inlet chamber 317 communicates with fluid inlet 309 through fluid passage 320. Outlet chamber 318 communicates with control fluid outlet 322 through outlet passage 321. Control rod 314 has or comprises fluid passages 323 and 324 positioned at predetermined positions to send or communicate a control fluid into and out of valve chamber 304 to move valve poppet 302. Control rod 314 can be moved with an external force between 2 positions. At first position 325, control rod 314 is pushed or forced to the left, as shown in FIG. 8, fluid passage 323 connects rod chamber 317 to rod chamber 317 so that the system fluid flows into poppet chamber 304, pushes or forces down valve poppet 302 and closes the valve outlet. At second position 326, control rod 314 is pushed or forced from left to right, as shown in FIG. 9. Fluid passage 324 now connects chamber 318 to chamber 319 so that fluid inside or within valve chamber 304 drains to control valve outlet 322 through passage 321 and outlet check valve 327. Check valve 327 prevents backflow of the system fluid when valve 300 is fully opened. Fluid passage 321 communicates with valve outlet 311.

Figure 10:
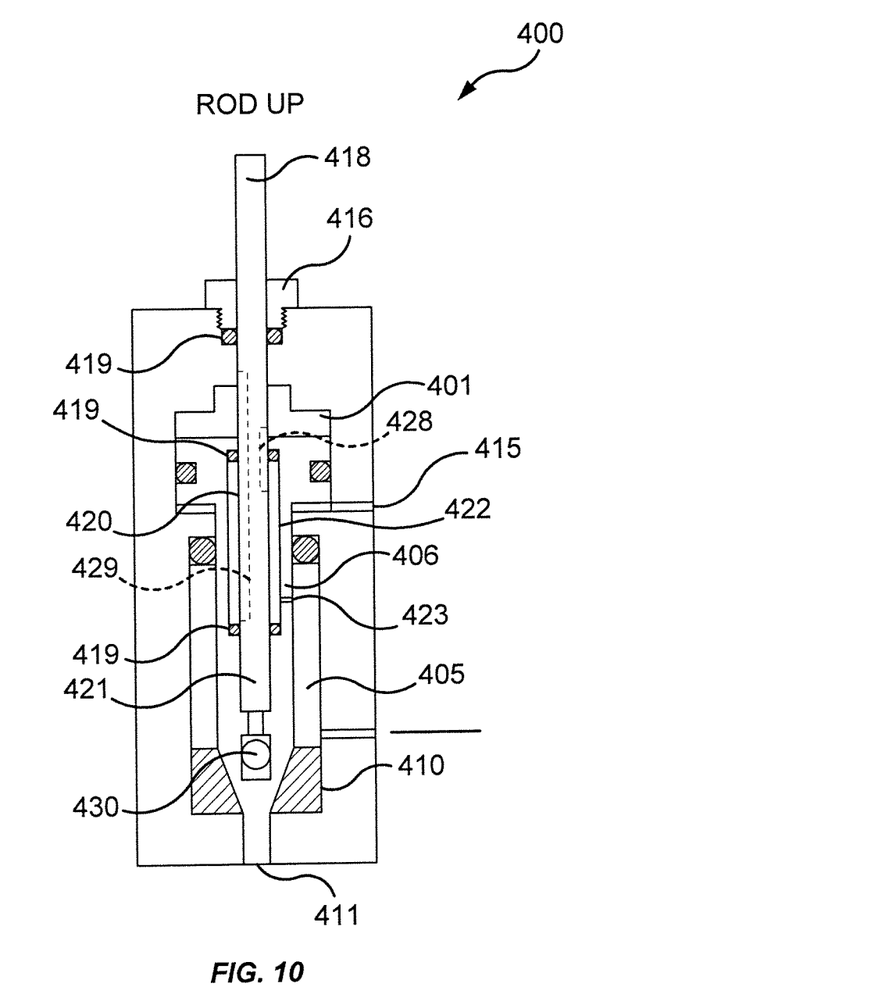
FIG. 10 shows a cross-sectional view of a pilot valve completely integrated with a main valve, with the control rod in a valve-closed position, according to one embodiment of this invention.

FIG. 10 shows another embodiment of this invention. Valve 400 has pilot valve 416 preferably but not necessarily completely integrated with main valve body 401. Control rod 418 is situated or positioned in a center of or a central portion of hollow valve poppet 406 and inside or within a relatively long valve poppet chamber 422. Rod seals 419 and rod bushings 420 define or form different zones along valve poppet chamber 422. Fluid inlet 423 communicates with valve poppet chamber 405 and with control rod chamber 422.

Control rod 418 has or comprises fluid passages 428 and 429 that are appropriately positioned to connect the 3 zones along control rod 418 in operation. When closing valve 400, control rod 418 is moved to its first position or up position, as shown in FIG. 10, and the system fluid flows from poppet chamber 405, fluid passage 423, into control chamber 422, control rod passage 428 and into valve cocking chamber 401. The system fluid exerts a force to push the valve poppet down to engage valve seat 410 and close valve exit 411.

Figure 11:
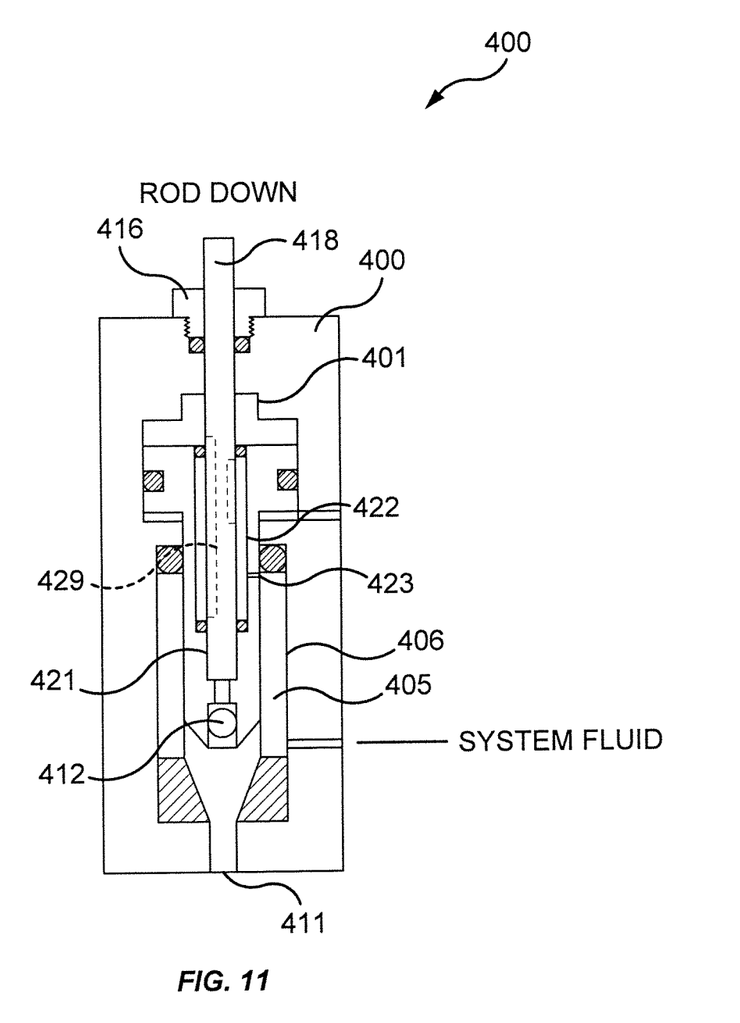
FIG. 11 shows a cross-sectional view of the pilot valve shown in FIG. 10, but with the control rod in a valve-open position, according to one embodiment of this invention.

To open valve 400, control rod 418 is pushed or forced down to its second position, such as shown in FIG. 11. The system fluid inside or within valve chamber 401 flows into control rod drain chamber 421 through fluid passage 429, and out of the valve poppet assembly through check valve 430. As a result, valve poppet 406 raises rapidly to open valve exit 411.

Valve 400 according to this invention clearly demonstrates that its operation does not involve the high pressure of the system fluid at or near the ends of control rod 418. One end is in the ambient or atmosphere and the other end is inside or within the valve and is exposed only to the spent fluid that already lost or decreased its energy inside or within drain chamber 421 of control rod chamber 422. This is accomplished by having fluid passages strategically positioned along the control rod and having the rod positioned inside or within a special cylindrical chamber designed to perform different duties by using rod seals and bushings. With this arrangement, the pressurized system fluid is utilized or used to open and close the relatively large valve with a relatively minimum outside force even when the system fluid operates under relatively high operating fluid pressures.

Example 1

Figure 12:
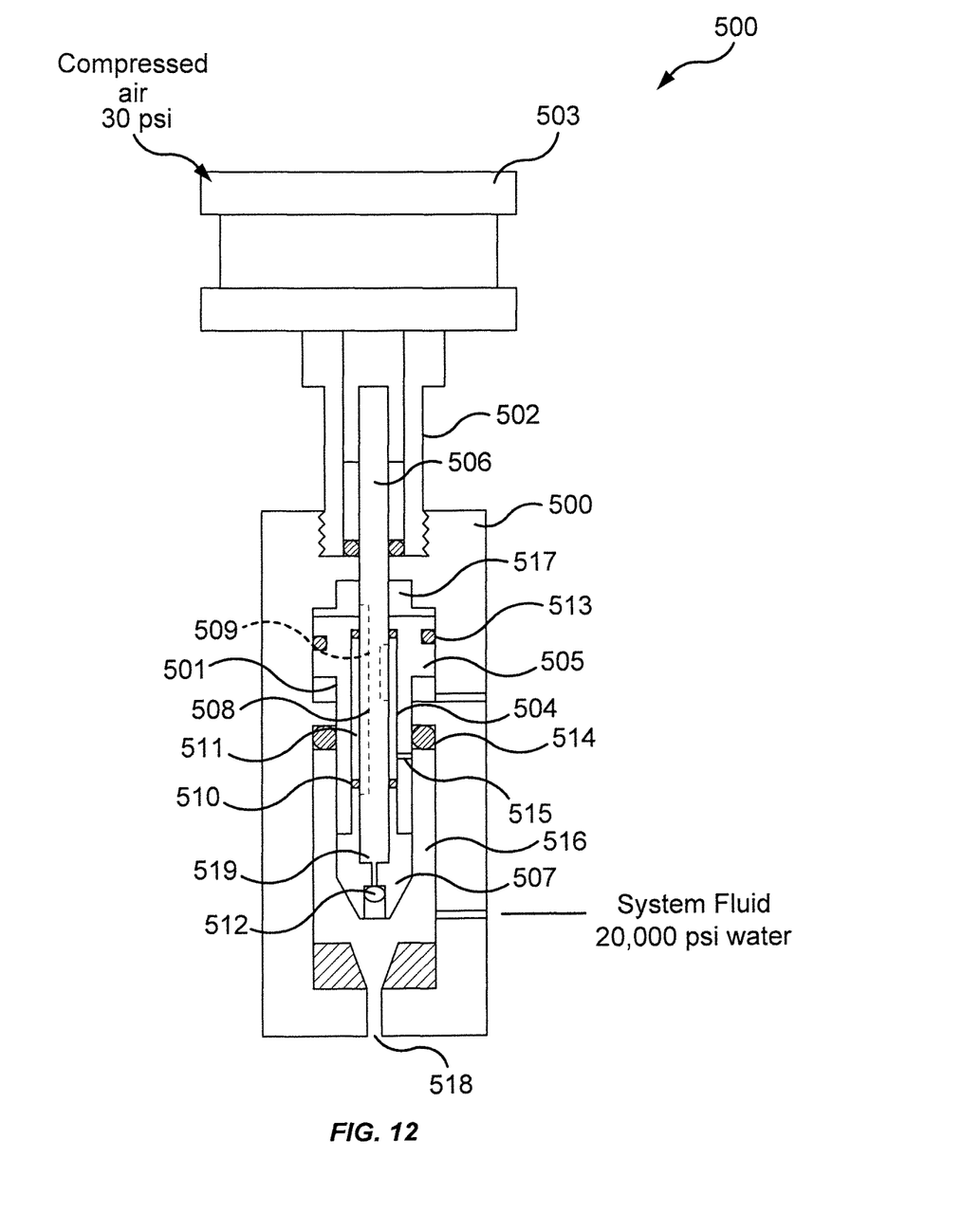
FIG. 12 shows a cross-sectional view of a main valve assembly having a valve cartridge and an actuator, according to one embodiment of this invention.

In order to better illustrate details of this invention, valve assembly 500 is constructed according to one embodiment of this invention. Valve assembly 500 comprises valve body 500, valve cartridge 501, actuator adapter 502, and air actuator 503. Valve cartridge 501 has a cylindrical cartridge body 504 made of or comprising stainless steel, cartridge head 505 made of or comprising a hardened stainless steel, and a relatively long control rod 506 made of or comprising a hardened stainless steel.

Cartridge body 504 is 0.312 inches in outside diameter and has shoulder 505 that has an outside diameter of 0.403 inches. Valve cartridge 504 comprises head 507 made of or comprising hardened stainless steel and is also 0.312 inches in outside diameter. Valve cartridge 501 and cartridge head 507 are cemented or adhered together and have a total length of 2.500 inches. Control rod 506 is 3.000 inches in length and is 0.125 inches in diameter and has or comprises internal fluid passages 508 and 509, for example made by Electrical Discharge Machining (EDM), of about 0.022 inches in diameter and positioned at or near accurate selected positions so that they provide a fluidic connection to selected fluid chambers when control rod 506 is moved.

Control rod 506 has or comprises rod seals 510 and rod bushings 511 so that a space around control rod 506 inside or within valve cartridge 504 is divided into multiple zones, an inlet zone, an outlet zone and a cocking zone such as in the case of valve 400 as shown in FIGS. 10 and 11. The inside diameter of control rod 506 chamber is 0.188 inches. Valve cartridge head 507 has or comprises check valve 512 located or positioned at its tip and is made of or comprises a stainless steel ball of 0.08 inches in diameter and is supported by a set screw so that the fluid can go or flow out only.

Cartridge shoulder 505 has or comprises polymeric seal 513 of 0.403 inches in outside diameter and also has polymeric seal 514 of 0.403 inches in outside diameter. Valve cartridge 504 has or comprises fluid passage 515 in communication with valve inlet chamber 516 and with the inlet zone of control rod 506. Valve 500 has or comprises cocking chamber 508 positioned above valve cartridge 505 that is fluidly connected to or in communication with fluid passage 508 of control rod 506.

Control rod 506 is attached to a piston of air actuator 503 which has or comprises a 2-inch diameter piston and a travel distance of 0.250 inches. Thus, when compressed air is introduced into air actuator 503, control rod 506 moves in a downward direction 0.250 inches. This movement distance causes the system fluid to flow from valve chamber 517 to valve chamber 519. As a result, valve cartridge 505 moves in an upward direction inside or within chamber 516 and to open valve exit 518.

This result is observed with a system fluid being or at about 20,000 psi water and about 30 psi compressed air. Valve exit 518 closed again when the compressed air in actuator 503 is released as the actuator piston moves in an upward direction inside or within the actuator by the action of the internal spring of the actuator.

Example 2

Figure 13:
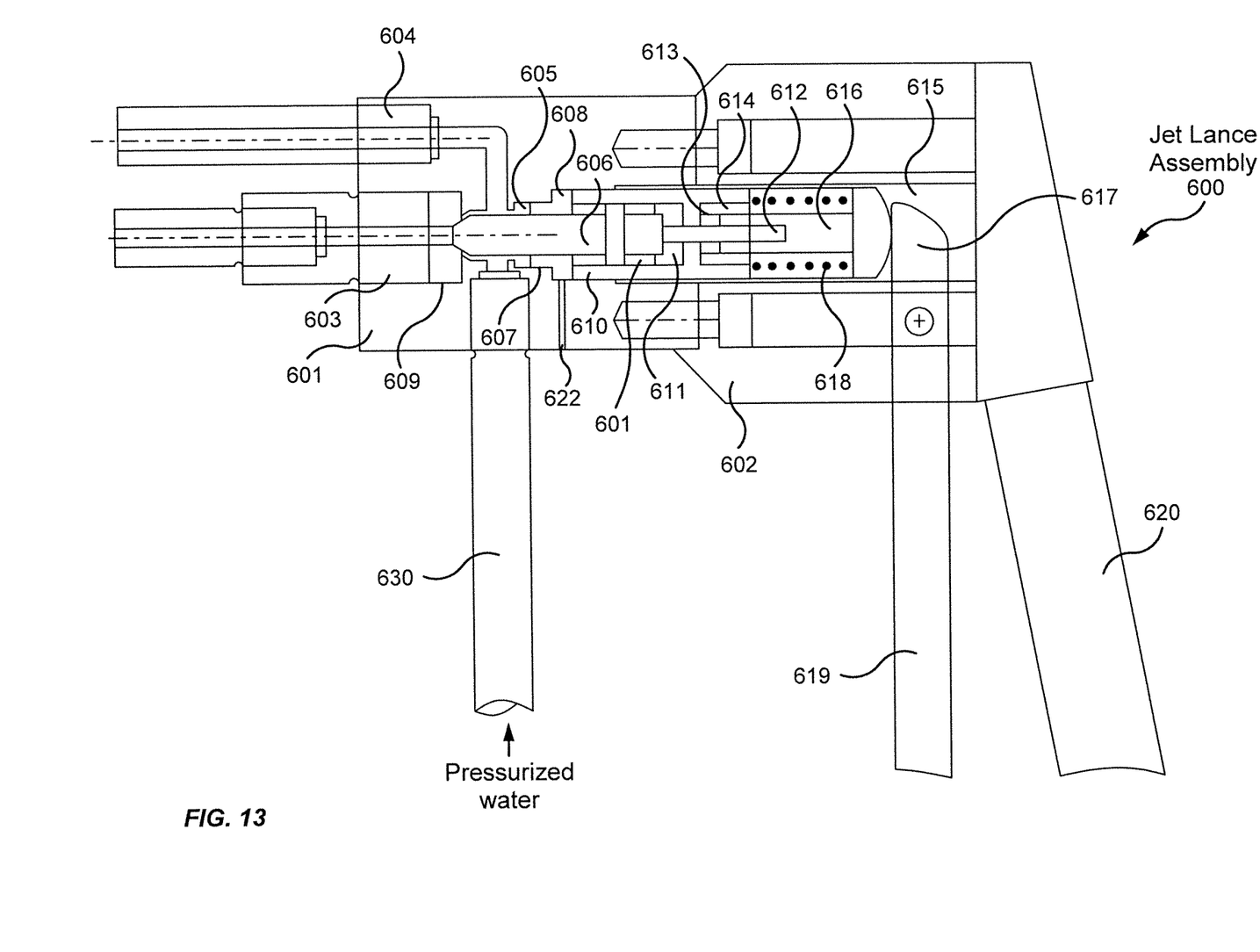
FIG. 13 shows a cross-sectional view of a hand-held waterjet lance, according to one embodiment of this invention.

According to some embodiments of this invention and to even better illustrate details of this invention, a hand-held waterjet lance is constructed or manufactured using a valve cartridge, such as shown in FIG. 11. Waterjet lance assembly 600 has or comprises stainless steel valve body 601 attached or secured at one end by threads or a threaded connection to an aluminum operating block 602 and 2 waterjet outlets 603 and 604 at the other end. Valve body 601 has or comprises cylindrical cavity 605 housing valve cartridge 606 together with cartridge seal assembly 607 and brass partition disc 608.

Cylindrical cavity 605 has or comprises valve seat 609 on one end in communication with waterjet outlet 603 and a cavity plug 610 at the other end. Cavity plug 610 is attached or connected to valve body 601 by threads or a threaded connection and is constructed or made of stainless steel and has central cavity 611 to accommodate valve cartridge 606. Cavity plug 610 has or comprises a central hole to accommodate control rod 612. Cavity plug 610 also accommodates control rod seal assembly 613 and a corresponding back-up screw 614.

Cavity plug 610 also keeps or maintains partition disc 608 in place or in position. Control rod 612 extends into central cavity 615 and is engaged to rod extension 616 that abuts one end of hand lever 617. Compression spring 618 is positioned around rod extension 616 and keeps or maintains control rod 612 in an extended position, which represents a valve-closed position as chamber 611 is filled with pressurized water.

Jet lance assembly 600 has or comprises water inlet tube 630 that sends or transmits pressurized water to valve cavity 605 and to water outlet 604 and valve seat 609. The jet lance of this invention has one advantageous feature of its ability to be used both as a dump mode dump gun and a dry shut off mode shutoff gun, for example at pressures as high as about 40,000 psi. In dump mode operations, water outlets 503 and 504 are both in use. By pulling lever 619 towards handle 620, control rod 612 is pushed or moved in a forward direction into valve cartridge 606. As a result, water in chamber 611 is drained and valve poppet 606 moves away from valve seat 609. As a result, both water outlets 603 and 604 are open and the water inside or within loses its pressure, and thus rendering or causing cavity 605 to be harmless.

When jet lance 600 is in a shut off mode operation, outlet 604 of jet lance 600, according to this invention, is closed with a suitable plug and the system water exits through the outlet only and the water flow is controlled by operating the valve cartridge through lever 619. Jet lance 600 is easily operated by a human hand at water pressures up to about 40,000 psi, due to the fact that control rod 612 is not exposed to frontal water forces when the rod is pushed into the cartridge to drain the water inside cocking chamber 611 of the valve poppet.

A hand force is used to overcome the seal gripping forces acting on the control rod. The same or similar results occur in both the dump mode of operation and the shut off mode of operation. Valve cartridge 606 is seated to close the valve by the water force in chamber 611 and is moved to open the valve by water force inside valve cavity 605. Importantly, partition disc 608 is situated or positioned between cartridge 607 and 621 and is open to the atmosphere through bleed hole 622. Thus, the water forces are not opposing each other. Both closing and opening of the valve port is thus assured.

Conversely, currently available waterjet dump guns required a human hand force to close the dump gun at water operating pressures by holding onto the valve lever. With waterjet shut off valves, there are none conventionally available at water pressures above about 5,000 psi because a human hand force cannot provide enough or sufficient hand gripping forces to move a 0.06 inch diameter valve stem operating at about 5,000 psi. Thus, at operating water pressures above about 10,000 psi, there are no conventionally available shut off guns in current waterjet operations. Thus, a waterjet built and operated according to this invention can be used to overcome this problem.

While in the foregoing detailed description this invention has been described in relation to certain preferred embodiments thereof, and many details have been set forth for purposes of illustration, it will be apparent to those skilled in the art that this invention is susceptible to additional embodiments and that certain of the details described herein can be varied considerably without departing from the basic principles of this invention.

The invention claimed is:

1. An on-off valve operable between an open position and a closed position, the on-off valve comprising:
 a valve body having a cylindrical valve cavity, a valve body passage communicating with the valve cavity, an inlet and an outlet, in the open position the inlet in communication with the outlet;
 a partition within the valve cavity and dividing the valve cavity into a first chamber and a second chamber, the partition having a central bore;
 a valve poppet slidably mounted within the valve cavity, the valve poppet positioned within the bore and having a first end portion positioned within the first chamber and a second end portion positioned within the second chamber, the second end portion sealably closing the valve outlet in the closed position, the first end portion having a first diameter larger than a second diameter of the second end portion, the first end portion having a first circumferential seal within the first chamber, the second end portion having a second circumferential seal within the second chamber, the valve body having a bleed hole communicating with an atmosphere;
 a valve seat communicating with the second end portion of the valve poppet, the valve seat positioned at the valve outlet;
 a valve end plug positioned at the end of the first chamber of the valve cavity; and
 a rod seal connected to the valve body, a rod bushing connected to the valve body, the rod seal and the rod bushing dividing a rod cavity into 3 zones, including an inlet chamber, an outlet chamber and a cocking chamber, a pilot valve comprising a first control rod and a second control rod parallel to the first control rod and both moving together between a first position and a second position, in the first position the first control rod permits a control fluid to flow to the first chamber and forces the valve poppet to move and close the valve outlet and operate the on-off valve in the closed position, in the second position fluid within a valve chamber drains through the valve body passage and to a valve outlet of the pilot valve, the first control rod has a first fluid passage, the second control rod has a second fluid passage, in the first position the control fluid enters a control fluid inlet, the inlet chamber, through the second fluid passage, into the cocking chamber, through the valve body passage and into the valve cavity to push the valve poppet and close the outlet of the valve.

2. The on-off valve according to claim 1, wherein the on-off valve operates with a system fluid and the first control rod and the second control rod operate with the control fluid that is different from the system fluid.

3. The on-off valve according to claim 1, wherein fluid forces within the first chamber act to move the valve poppet.

4. The on-off valve according to claim 1, wherein in the second position of the first control rod and the second control rod, the control fluid within the valve cavity is drained and passes through the valve body passage, the cocking chamber, the first fluid passage, the outlet chamber, and the valve outlet of the pilot valve to open the outlet of the valve body.

5. A method for operating an on-off valve between an open position and a closed position, including the steps of:

forming a valve body having a cylindrical valve cavity, a valve body passage communicating with the valve cavity, an inlet and an outlet in communication with each other when the on-off valve is in the open position;

dividing the valve cavity into a first chamber and a second chamber with a divider having a central bore;

slidably mounting a valve poppet within the valve cavity;

positioning the valve poppet within the bore to have a first end portion within the first chamber and a second end portion within the second chamber;

sealably closing the valve outlet with the second end portion when the on-off valve is in the closed position;

forming the first end portion to have a first diameter larger than a second diameter of the second end portion;

forming a circumferential seal with the first end portion within the first chamber;

forming a circumferential seal with the second end portion within the second chamber;

forming communication between a bleed hole of the valve body and an atmosphere;

forming communication between a valve seat with the second end portion of the valve poppet and the valve seat positioned at the valve outlet;

positioning an end plug at an end of the first chamber of the valve cavity; and wherein a rod seal is connected to the valve body, a rod bushing is connected to the valve body, the rod seal and the rod bushing divide a rod cavity into 3 zones, including an inlet chamber, an outlet chamber and a cocking chamber, a pilot valve including a first control rod and a second control rod parallel to the first control rod move together between a first position and a second position, in the first position the first control rod and the second control rod permits a control fluid to flow to the first chamber and forces the valve poppet to move and close the valve outlet and operate the on-off valve in the closed position, the first control rod has a first fluid passage, the second control rod has a second fluid passage, in the first position the control fluid enters a control fluid inlet, the inlet chamber, through the second fluid passage, into the cocking chamber, through the valve body passage and into the valve cavity to push the valve poppet and close the outlet of the valve.

6. The method according to claim 5, wherein the on-off valve operates with a system fluid and the first control rod and the second control rod operate with the control fluid that is different from the system fluid.

7. The on-off valve according to claim 5, wherein fluid forces within the first chamber act to move the valve poppet.

8. The method according to claim 5, wherein in the second position of the first control rod and the second control rod, the control fluid within the valve cavity is drained and passes through the valve body passage, the cocking chamber, the first fluid passage, the outlet chamber, and a fluid outlet to open the outlet of the valve body.

* * * * *